US008555402B2

(12) United States Patent
Akselrod et al.

(10) Patent No.: US 8,555,402 B2
(45) Date of Patent: Oct. 8, 2013

(54) DYNAMIC SELECTION OF AUTHORIZATION PROCESSES

(75) Inventors: Gregory Akselrod, Seattle, WA (US); Tianyu Xie, Redmond, WA (US); Scott Kurtzeborn, Redmond, WA (US); Gordon Hardy, Seattle, WA (US); Sanjay Garg, Redmond, WA (US); Chad Shurtz, Marysville, WA (US); Karvell Li, Bellevue, WA (US); Robert Donner, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/359,241

(22) Filed: Jan. 26, 2012

(65) Prior Publication Data
US 2013/0198855 A1 Aug. 1, 2013

(51) Int. Cl.
G06F 7/04 (2006.01)
G06F 21/00 (2013.01)

(52) U.S. Cl.
USPC ............................................. 726/26; 705/59

(58) Field of Classification Search
USPC ............................................. 726/26; 705/59
See application file for complete search history.

(56) References Cited

U.S. PATENT DOCUMENTS

| 6,510,466 | B1* | 1/2003 | Cox et al. ...................... 709/229 |
| 7,266,594 | B2 | 9/2007 | Kumbalimutt et al. |
| 7,930,273 | B1 | 4/2011 | Clark et al. |
| 7,937,244 | B2 | 5/2011 | Kadaba |
| 7,991,385 | B1* | 8/2011 | Rosenberg et al. .......... 455/406 |
| 2002/0032763 | A1* | 3/2002 | Cox et al. ...................... 709/223 |
| 2002/0107809 | A1 | 8/2002 | Biddle et al. |
| 2005/0262573 | A1* | 11/2005 | Bo et al. .......................... 726/27 |
| 2008/0082449 | A1 | 4/2008 | Wilkinson et al. |
| 2009/0326964 | A1 | 12/2009 | Garg et al. |
| 2009/0327091 | A1 | 12/2009 | Hartin et al. |
| 2012/0036220 | A1* | 2/2012 | Dare et al. ..................... 709/217 |
| 2012/0110345 | A1* | 5/2012 | Pigeon et al. ................. 713/189 |

FOREIGN PATENT DOCUMENTS

| KR | 10-2005-0007897 A | 1/2005 |
| KR | 10-2011-0104802 A | 9/2011 |

OTHER PUBLICATIONS

Gregg Keizer; "Software Licensing Said to be Set for Dramatic Shifts;" InformationWeek; Mar. 23, 2004; pp. 1-4; http://www.informationweek.com/news/windows/showArticle.jhtml;jsessionid=LNFPEDEKUDUVKQSNDLRSKH0CJUNN2JVN?articleID=18401482&_requestid=257357.
Symantec; "Veritas Storage Foundation™ Release Notes;" 2009; pp. 1-86; Product Version 5.1; Symantec Corporation; Mountain View, California; http://docs.oracle.com/cd/E19186-01/875-4620-10/875-4620-10.pdf.
Hewlett-Packard; "HP Exstream License Redemption Guide;" Jul. 2009; pp. 1-11; Hewlett-Packard Development Company, L.P.; http://welcome.hp.com/country/us/en/prodserv/software/eda/pdf/additional_resources_support/Red_Guide.pdf.
"AVG Licensing Model;" Dec. 9, 2011; p. 1; http://www.avg.com.au/terms/licensing-model/.
Microsoft; "Triggers;" TechNet; 2011; pp. 1-4; Microsoft; http://technet.microsoft.com/en-us/library/cc748841(WS.10).aspx.
Microsoft; "Explore the free Office Web Apps;" 2011; pp. 1-2; Microsoft; http://office.microsoft.com/en-us/.
"International Search Report", Mailed Date: May 9, 2013, Application No. PCT/US2013/022356, Filed Date: Jan. 21, 2013, pp. 9. (MS# 335081.02).

* cited by examiner

*Primary Examiner* — Techane Gergiso

(57) ABSTRACT

Systems, methods, and software are disclosed herein for licensing applications using a preferred authorization process dynamically identified based on conditions associated with an initiation of an application. Authorization is then attempted using the preferred authorization process. In some examples, the preferred authorization process is selected from at least a keyless authorization process and a key-based authorization process.

16 Claims, 6 Drawing Sheets

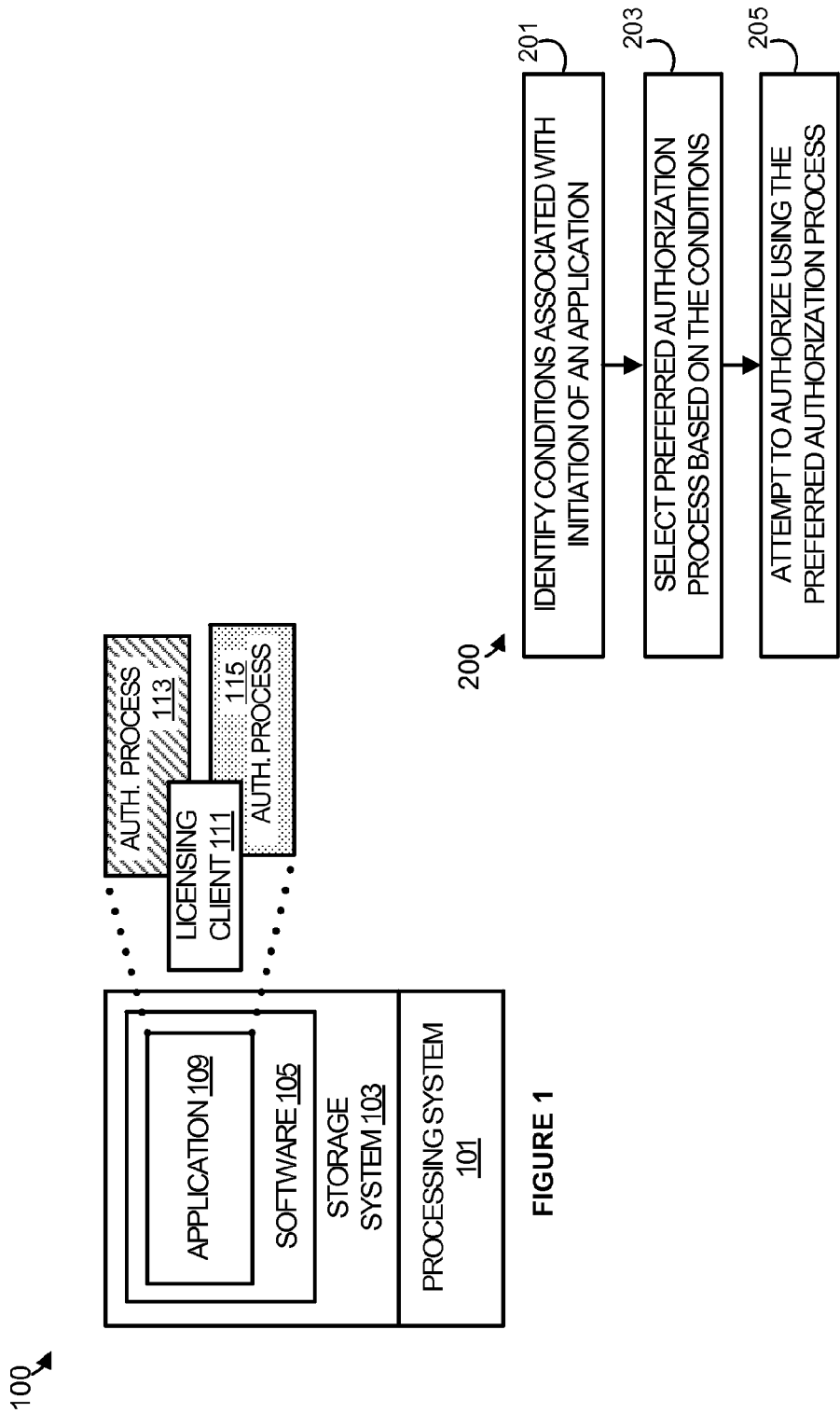

DYNAMIC SELECTION OF AUTHORIZATION PROCESSES

TECHNICAL FIELD

Aspects of the disclosure are related to software licensing technology, and in particular, to the dynamic selection of authorization processes for authorizing applications.

TECHNICAL BACKGROUND

In the field of software licensing technology, the pursuit to limit the unauthorized use of software often exists in tension with the desire to deploy software in user-friendly ways. Generally, the more secure a licensing mechanism, the less accommodating it may be to the various ways with which a user may desire to interact with an application. In contrast, licensing mechanisms that are flexible in view of changing user behavior patterns may provide less than desired protection against unauthorized use.

For example, users have become increasingly accustomed to accessing software applications of all types from various locations and platforms, while enjoying the same rich features and experience as if they were working locally. From one moment to the next users may work with an application on their desktop computer, and then away from it on a mobile device or on the computer of another person. Users also enjoy the ability to use applications almost immediately upon starting or installing them.

While some software providers have simply given up trying to balance enforcement and convenience, opting for one or the other, many approaches have been taken to address this dynamic. Some involve sign-in procedures that authorize applications based on user identity, while others involve complex key management paradigms. However, the challenge to provide flexible and secure licensing of software applications will persist as long as application environments and use patterns continue to evolve.

Overview

Provided herein are systems, methods, and software that provide for flexible licensing enforcement by dynamically selecting a preferred authorization process when an application is initiated. The preferred authorization process can be selected based on conditions surrounding the initiation of the application, such as the environment within which the application is initiated or the progress of an installation process. By dynamically identifying and attempting to use a preferred authorization process, users will enjoy licensed access from any location or device of their choosing, and can be productive soon after starting or installing an application. Licensing mechanisms can still be deployed that protect the interests of the software provider.

For instance, when an application is initiated from within a roaming environment, a keyless authorization process may be selected to authorize the use of the application. In contrast, a key-based authorization process may be selected under other circumstances. This allows users to enjoy use of an application whether working with a locally installed and authorized copy, or when working away from their computer.

In another example, an application may be temporarily authorized using a keyless authorization process when a key-based authorization process is not available. This allows a user to be immediately productive upon purchasing an application, rather than delaying enjoyment of the application until after the key-based authorization process has been installed.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates an authorization system in an implementation.

FIG. 2 is a flow diagram illustrating the operation of an authorization system.

TECHNICAL DISCLOSURE

Figure 3:
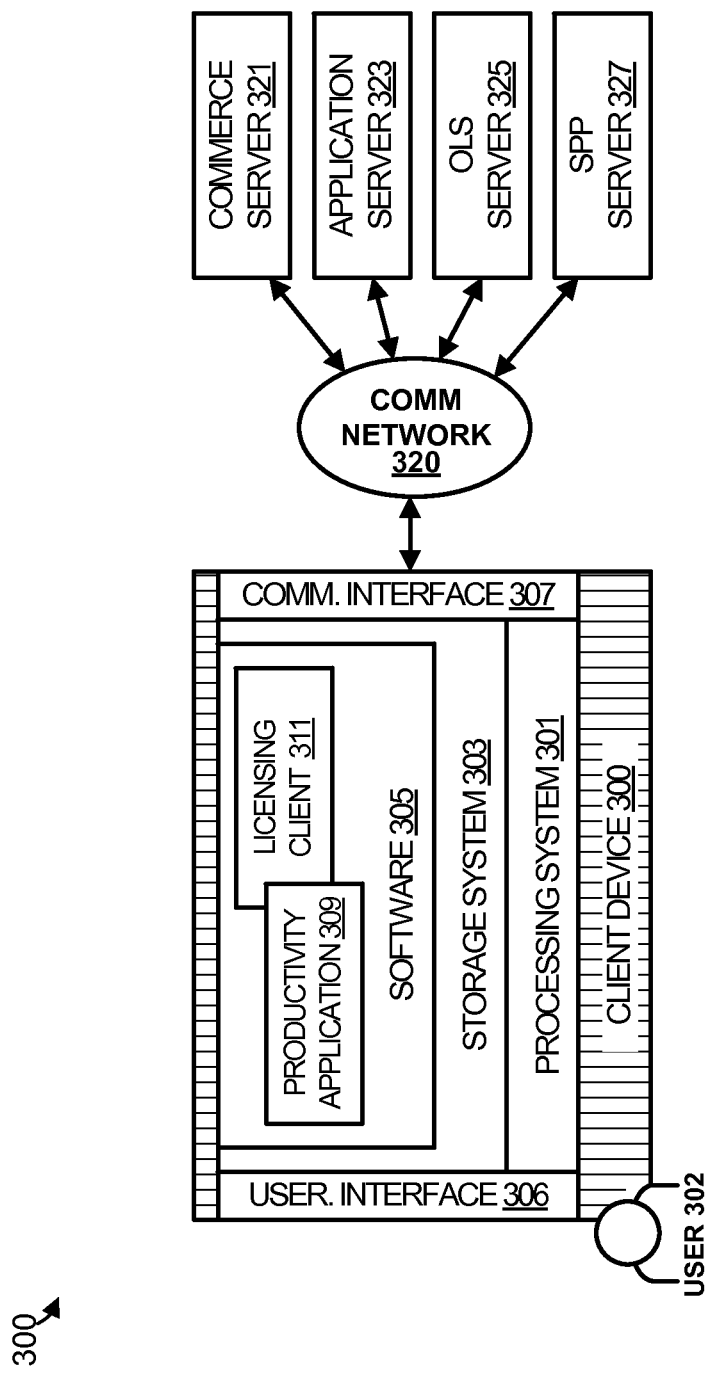
FIG. 3 illustrates an authorization system in an implementation.

Implementations described herein provide for flexible licensing enforcement as preferred authorization processes can be employed based on the conditions surrounding the operation of an application subject to a license. This flexibility will allow a user to rightfully enjoy the use of an application under a variety of circumstances without being hindered by cumbersome and inconvenient licensing mechanisms. At the same time, software producers will remain protected from illegitimate application use and its associated harms.

Some conditions that factor into the selection of the preferred authorization process may include the runtime environment within which the application is executed, the availability of the various authorization processes from which a preferred process may be selected, and the progress made by an application towards a fully installed state, as well as many other conditions and factors. Responding to these varied conditions, a licensing client can select an appropriate authorization process that will expedite user access in a manner that ultimately provides confirmation that an application is authorized.

For instance, a user may subscribe to or otherwise be authorized to use an application, but is temporarily away from the user's computer. The user may access a document through a web browser, triggering an instance of the application. A licensing client, integrated with or separate from the application, selects a preferred authorization process to authorize the user to use the application. In this example, the user can be temporarily authorized via a keyless authorization process to use the application during that roaming session, as opposed to soliciting a key from the user and authorizing via a key-based process.

In another example, a user may purchase an application by way of an online application store. While the application is downloading to the user's computer, the application can be authorized using a user identity provided by the user during the purchase or during an earlier online session. The user can immediately begin being productive with the application while some portions of it remain to be downloaded and installed, such as the components necessary to accept, validate, and secure a key used by a key-based authorization process.

In yet another example, the user may launch the application within an environment where an authorization key is available and where a key-based process with which to authorize the application is also available. In this scenario, the application can be authorized in a traditional way by applying the key to the key-based process to unlock the application.

In these scenarios, the licensing client is triggered upon the initiation of the application and identifies the authorization process preferred under the circumstances. The application is authorized according to the preferred process, allowing the user to access the application as quickly as possible, while also protecting the software producer.

FIGS. 1-2 are provided to illustrate one implementation of an authorization system 100 and its operation. FIG. 1 depicts elements of authorization system 100, while FIG. 2 illustrates process 200 that describes the operation of authorization system 100.

Referring now to FIG. 1, authorization system 100 includes processing system 101 and storage system 103. Software 105 is stored on storage system 103 and includes application 109 and licensing client 111. When executed by processing system 101, licensing client 111 selects which of authorization process 113 and authorization process 115 to implement, as will be discussed in more detail below with respect to FIG. 2.

Application 109 may be any type of computer application capable of running within authorization system 100. Examples of application 109 include productivity applications, entertainment applications, communication applications, and development applications, as well as any other type of application. Licensing client 111 may be an integrated component of application 109, but may also be a stand-alone application. Alternatively, licensing client 111 may be integrated with other elements within software 105, such as operating system software.

Authorization process 113 and authorization process 115 may each be any process capable of determining whether or not an application is authorized to be used. Authorization process 113 and authorization process 115 may each be executed by a single device, but may also be distributed across several devices. It should be understood that other authorization processes in addition to authorization process 113 and 115 are possible.

Turning to FIG. 2, process 200 describes the operation of authorization system 100 in an implementation, and in particular, the operation of licensing client 111 upon application 109 being initiated. For instance, application 109 may be launched from within a browsing session, started locally, or initiated as part of an installation process.

Upon initiating application 109, licensing client 111 identifies conditions associated with the initiation of application 109 (step 201). As mentioned above, the conditions may pertain to the environment within which application 109 is launched, the presence or availability of one or another of authorization processes 113 and 115, or the progress of an installation process. Other factors or conditions are possible that may be identified by licensing client 111 and taken into account when selecting the preferred authorization process.

Licensing client 111 may determine the conditions associated with the initiation of application 109 in a variety of ways. For example, licensing client 111 may read a value stored in memory that identifies the environment within which application 109 is initiated. The value may be set by a bootstrapper application utilized to launch application 109 or by some other application that is aware of the environment within which application 109 is launched.

Alternatively, licensing client 111 may query another application, whether residing locally or remotely, for information about the execution environment. In another alternative, licensing client 111 may query some other application or operating system element to determine the context within which it is running. Licensing client 111 could also query an operating system component to determine if an installation of application 109 has previously occurred. The environment within which application 109 is initiated may be evident from other applications running concurrently with application 109, such as a web browser application. Thus, licensing client 111 may query those other applications to determine the runtime conditions.

Based on the conditions identified in step 201, licensing client 111 selects a preferred authorization process from authorization process 113 and authorization process 115 with which to authorize application 109 (step 203). It should be understood that licensing client 111 could select from more authorization processes than just authorization process 113 and 115. Which process is selected as the preferred authorization process may be driven by the conditions communicated to licensing client 111. For instance, in the example given above, a particular value or range of values may drive licensing client 111 to select and utilize authorization process 113, while a different value or range of values may drive licensing client 111 to select and use authorization process 115.

Licensing client 111 then attempts to authorize application 109 using whichever of authorization processes 113 and 115 is the preferred authorization process (step 205). As mentioned, authorization processes 113 and 115 may each be implemented by authorization system 100, but may also be implemented in a distributed manner involving other devices. Implementing each of authorization process 113 and 115 may also involve performing portions of each process locally and other portions remotely.

Upon implementing the preferred authorization process, licensing client 111 learns whether or not the usage of application 109 is authorized for at least that instance of the application. Depending upon which authorization process is selected, application 109 may be authorized only temporarily, but may also be perpetually authorized, as well as authorized for some other duration of use. Periodic checks could be performed once application 109 is perpetually authorized to ensure that its authorization should be maintained Likewise, upgrades to application 109 or other changes to it may affect its authorization state.

Assuming application 109 is authorized, the user is able to begin being productive, such as by working with documents or spreadsheets generated using productivity application 109, engaging in communication sessions, or engaging in gaming sessions. If authorization fails, the user may be prevented entirely from using application 109. However, application 109 may also be presented in a reduced functionality mode that provides the user with limited use of its capabilities. Alternatively, authorization could be granted for a grace period, allowing the user to enjoy full functionality for a limited amount of time. Other consequences that results from a failed authorization are possible and are considered within the scope of this disclosure.

Referring back to FIG. 1, authorization system 100 and the associated discussion are intended to provide a brief, general description of a suitable computing environment in which process 200 may be implemented. Many other configurations of computing devices and software computing systems may be employed to implement process 200.

Authorization system 100 may be any type of computing system capable of dynamically identifying a preferred authorization process with which to authorize an application, such as a client computer, server computer, internet appliance, or any combination or variation thereof. Indeed, authorization system 100 may be implemented as a single computing system, but may also be implemented in a distributed manner across multiple computing systems. Authorization system 100 is provided as an example of a general purpose computing system that, when implementing process 200, becomes a specialized system capable of dynamically selecting preferred authorization processes.

Authorization system 100 includes processing system 101, storage system 103, and software 105. Software 105 includes application 109 and licensing client 111. Processing system 101 is communicatively coupled with storage system 103. Storage system 103 stores software 105, and licensing client 111 in particular, which when executed by processing system 101, directs authorization system 100 to operate as described for process 200.

Referring still to FIG. 1, processing system 101 may comprise a microprocessor and other circuitry that retrieves and executes software 105, and in particular application 109 and licensing client 111, from storage system 103. Processing system 101 may be implemented within a single processing device but may also be distributed across multiple processing devices or sub-systems that cooperate in executing program instructions. Examples of processing system 101 include general purpose central processing units, application specific processors, and logic devices, as well as any other type of processing device.

Storage system 103 may comprise any storage media readable by processing system 101 and capable of storing software 105, including application 109 and licensing client 111. Storage system 103 may include volatile and nonvolatile, removable and non-removable media implemented in any method or technology for storage of information, such as computer readable instructions, data structures, program modules, or other data. Storage system 103 may be implemented as a single storage device but may also be implemented across multiple storage devices or sub-systems. Storage system 103 may comprise additional elements, such as a controller, capable of communicating with processing system 101.

Examples of storage media include random access memory, read only memory, magnetic disks, optical disks, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software 105, including application 109 and licensing client 111 in particular, comprises computer program instructions, firmware, or some other form of machine-readable processing instructions having process 200 embodied therein. Application 109 and licensing client 111 may be implemented as a single application but also as multiple applications. Application 109 and licensing client 111 may be stand-alone applications but may also be implemented within other applications distributed on multiple devices, including but not limited to program application software and operating system software. As mentioned, licensing client 111 may be implemented within application 109.

In general, software 105 may, when loaded into processing system 101 and executed, transform processing system 101, and authorization system 100 overall, from a general-purpose computing system into a special-purpose computing system customized to dynamically select a preferred authorization process for an application as described by process 200 and its associated discussion.

Encoding software 105, and application 109 and licensing client 111 in particular, may also transform the physical structure of storage system 103. The specific transformation of the physical structure may depend on various factors in different implementations of this description. Examples of such factors may include, but are not limited to: the technology used to implement the storage media of storage system 103, whether the computer-storage media are characterized as primary or secondary storage, and the like.

For example, if the computer-storage media are implemented as semiconductor-based memory, software 105, and application 109 and licensing client 111 in particular, may transform the physical state of the semiconductor memory when the software is encoded therein. For example, software 105 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

Referring again to FIGS. 1-2, through the operation of authorization system 100 employing licensing client 111, transformations are performed on application 109. As an example, application 109 can be considered transformed from one state to another by the preferred authorization process identified by licensing client 111.

Authorization system 100 may have additional devices, features, or functionality. Authorization system 100 may optionally have input devices such as a keyboard, a mouse, a voice input device, or a touch input device, and other comparable input devices. Output devices such as a display, speakers, printer, and other types of output devices may also be included. Authorization system 100 may also contain communication connections and devices that allow authorization system 100 to communicate with other devices or systems, such as over a wired or wireless network in a distributed computing and communication environment. These devices are well known in the art and need not be discussed at length here.

Figure 4:
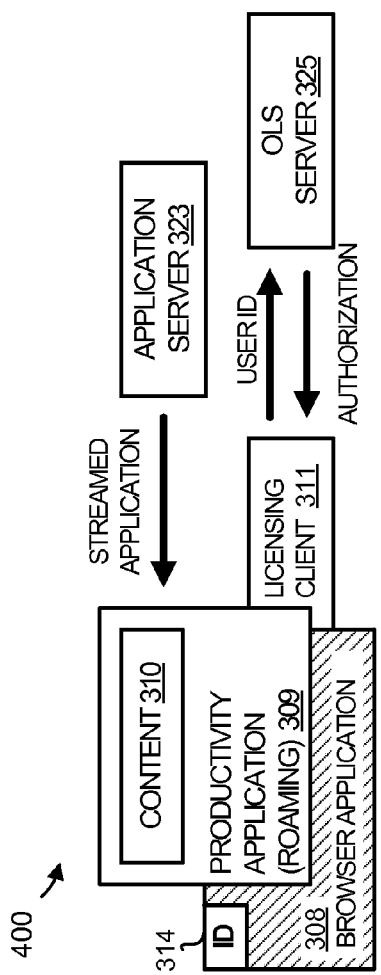
FIG. 4 illustrates a functional view of an authorization system.
Figure 5:
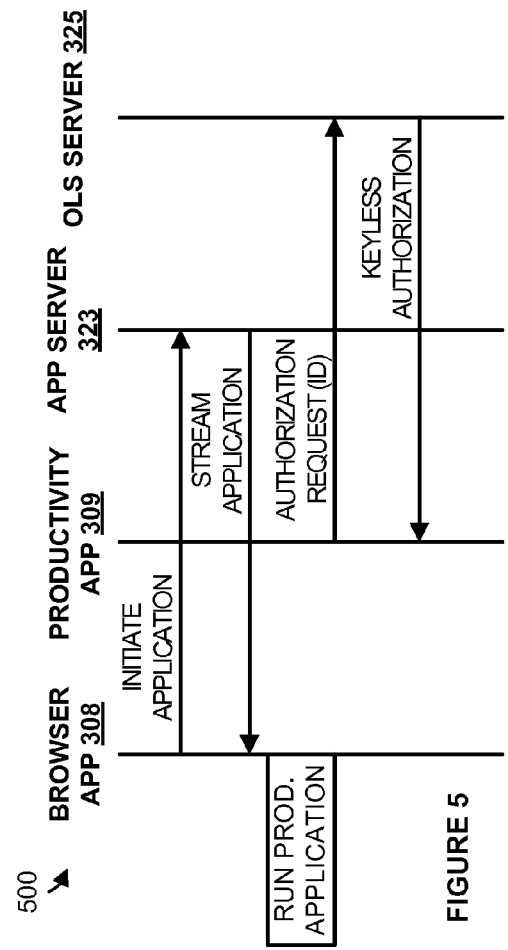
FIG. 5 illustrates an operational sequence for an authorization system.
Figure 6:
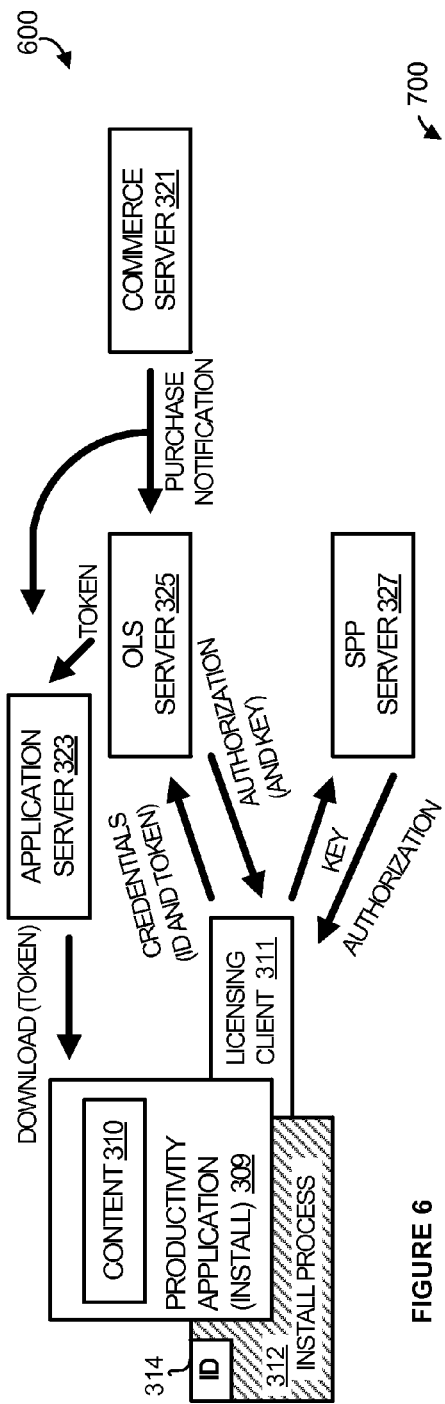
FIG. 6 illustrates a functional view of an authorization system.
Figure 7:
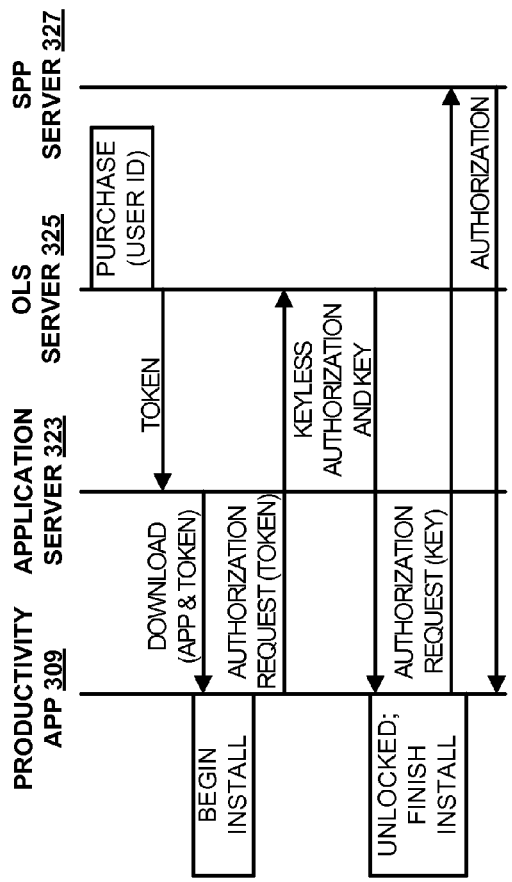
FIG. 7 illustrates an operational sequence for an authorization system.

FIG. 3 illustrates authorization system 300 in an implementation, while FIGS. 4-9 illustrate several functional views of authorization system 300 and operational sequences related to its operation. In particular, FIG. 4 and FIG. 5 illustrate the operation of authorization system 300 in a roaming context. FIG. 6 and FIG. 7 illustrate the operation of authorization system 300 in an installation context, while the context illustrated in FIG. 8 and FIG. 9 pertains to the unavailability of an authorization service. FIG. 10 contains a flow diagram pertaining to a process 1000 implemented by authorization system 300. Together, FIGS. 4-10 demonstrate mechanisms for licensing productivity application 309 that can be flexibly deployed and enforced across a variety of contexts and environments.

The functional views, operational sequences, and flow diagrams provided in FIGS. 4-10 are representative of exemplary architectures and methodologies for performing novel aspects of the disclosure. While, for purposes of simplicity of explanation, the methodologies included herein are in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Referring now to FIG. 3, authorization system 300 includes client device 300 operated by user 302. Client device 300 includes processing system 301, storage system 303, software 305, user interface 306, and communication interface 307. Software 305 includes productivity application 309 and licensing client 311. Client device 300 communicates over communication network 320 with commerce server 321, application server 323, online licensing service (OLS) server 325, and software protection platform (SPP) server 327.

Commerce server 321 provides application purchase capabilities to user 302. For instance, user 302 may desire to purchase an application or subscribe to an application service. Utilizing client device 300, user 302 can obtain the application by way of commerce server 321. Commerce server 321 may provide some commercial functions, such as transaction processing and the like.

Application server 323 provides user 302 with an instance of the application purchased or subscribed to via commerce server 321. It should be understood that application server 323 and commerce server 321 may be implemented separately, but may also be implemented in an integrated manner. Application server 323 may be capable of providing productivity application 309 to client device 300 in a variety of ways, such as by downloading productivity application 309 to client device 300 or streaming productivity application 309 to client device 300. Application server 323 may also be employed within a variety of contexts, such as within a hosted service. It should be understood that application server 323 is merely representative of the many application servers that may be employed to stream or download applications to client device 300.

OLS server 325 functions to provide authorization services accessible by client device 300 to obtain authorization for productivity application 309. Similarly, SPP server 327 functions to provide authorization services to client device 300. In particular, OLS server 325 communicates with licensing client 311 to implement an authorization process, while SPP server 327 also communicates with licensing client 311, but to implement a different authorization process than that provided by OLS server 325. For example, SPP server 327 may implement a key-based authorization process involving use of a product key, while OLS server 325 may implement a keyless authorization. A more detailed discussion of the interaction between licensing client 311 and OLS server 325 and SPP server 327 follows below with respect to FIGS. 4-9.

Client device 300 may be any type of device capable of executing productivity application 309 and licensing client 311, such as a desktop, laptop, or tablet computer, as well as a mobile computing device, internet appliance device, or any other type of device suitable for running applications. The discussion of FIGS. 3-10 is within the context of productivity applications, but it should be understood that the concepts disclosed herein apply as well to any type of application subject to licensing constraints that require some form of authorization.

FIG. 4 illustrates a functional view 400 of authorization system 300 operating within a roaming context. Functional view 400 includes browser application 308, within which productivity application 309 is executed. Content 310 is included to demonstrate that productivity application 309 may be used to work on or otherwise produce content, such as word processing documents, spreadsheets, presentations, and the like.

In this implementation, productivity application 309 is considered to be initiated in a roaming mode within a roaming environment because it is streamed from application server 323 to browser application 308. In addition, productivity application 309 may be considered to be initiated in the roaming mode when it has not already been authorized on a target computer. For example, a user may want to work with a productivity application that is not installed on the computer being used, and thus accesses the productivity application via an application server capable of streaming the productivity application or otherwise giving the user temporary use of the application. In contrast, a productivity application that is fully installed and licensed on a host computer may be considered to run natively on that computer. Thus native use of the productivity application in that situation would not be considered a roaming scenario.

It is assumed for the illustrative purposes of FIG. 4 and FIG. 5 that productivity application 309 was not previously installed on client device 300, and thus must be streamed. In addition, it is assumed that client device 300 is not initially authorized to run application 309 within the roaming context, thus requiring licensing client 311 to attempt authorization.

As mentioned, application server 323 may be implemented within a hosted service, such as a webmail service or a cloud storage service, from which applications can be launched when associated content is accessed. In this case, content 310 may also initially reside within the hosted service. By clicking on or otherwise selecting content 310 through browser application 308, application server 323 is triggered to launch an instance of the application associated with content 310, which becomes productivity application 309 as it is streamed from application server 323. For example, content 310 may be a document that can be opened with a document editor, such as Microsoft® Word. Word can be streamed using any well-known streaming technology, such as the Click-2-Run platform provided by Microsoft®, in order to open the document. It should be understood that other actions may trigger application server 323 to launch an instance of a desired application other than via an attempt to engage with content 310. For instance, a user may attempt to open a new document within a hosted service, thereby triggering the associated application.

As indicated, user 302 may provide user identifier (ID) 314 while engaged in a session with application server 323, or some other session provided through browser application 308. User 302 could be prompted by way of user interface 306 to enter user ID 314 before or at the time productivity application 309 is initiated. However, user ID 314 may also be stored by browser application 308 during an earlier session with the hosted service or some other service. In that case, browser application 308 may pass user ID to licensing client 311. User 302 may be required to enter other information in addition to user ID 314, such as a password or personal identification number. In fact, any appropriate mechanism may be employed to identify user 302.

Licensing client 311 communicates user ID 314 to OLS server 325, in response to which authorization of productivity application 309 may be provided by OLS server 325. OLS server 325 processes user ID 314 to determine if user 302 is authorized to use productivity application 309. This may range from a relatively simple process of looking up the identity of user 302 from a list of authorized users, to performing more complicated processing involving user ID 314 and other information, including for example a password.

User 302 may be authorized for a number of reasons, including having purchased and installed productivity application 309 on another computer, being subscribed to an application service that allows user 302 to use productivity application 309, or belonging to an organization that has authorized access to productivity application 309. Other reasons why user 302 may be authorized are possible and are contemplated within the scope of this disclosure.

FIG. 5 illustrates an operational sequence 500 involving the components provided in functional view 400. To begin, browser application 308 initiates productivity application 309 by way of a communication to application server 323. This may be triggered in a number of ways, such as user 302 clicking on a link provided within a hosted service. As mentioned above, the hosted service may contain files, such as word processing documents, spreadsheets, or the like, that trigger the launch of an application when selected.

In response to the communication initiated by browser application 308, application server 323 streams productivity application 309 to browser application 308 for presentation to user 302. This may be accomplished by way of any suitable application streaming technology, such as Click-2-Run. Content 310 may be included with the streamed application bits, or content 310 may be downloaded separately to client device 300. Browser application 308 runs productivity application 309, including licensing client 311.

The environment within which productivity application 309 is executed drives whichever one of the authorization processes supported by OLS server 325 and SPP server 327 is the preferred authorization process to authorize productivity application 309. In this scenario, a bootstrapper application may be executed with the launch of productivity application 309 that is generally associated with the initiation of applications from application server 323. The bootstrapper, among other tasks, sets a value in memory indicative of the environment within which productivity application 309 will be run. In this case, the value is set to indicate that the environment is a roaming environment. When productivity application 309 starts, this value drives whether productivity application 309 communicates with OLS server 325 to obtain authorization, or whether productivity application 309 communicates with SPP server 327 to obtain authorization. Code running within productivity application 309, such as licensing client 311, checks the value and responsively begins the authorization process supported by OLS server 325, or the authorization process supported by SPP server 327.

Multiple versions of the bootstrapper application may be available for deployment based on the conditions under which productivity application 309 is initiated. For instance, when productivity application 309 is initiated from within a hosted service, such as a webmail or cloud drive service, application server 323 may deploy a version of the bootstrapper application that sets the value to identify the environment as roaming. However, when productivity application 309 is initiated from within a different context or environment, such as an install scenario, a different bootstrapper application may be used that sets the value to identify the environment as an installation.

Upon determining that productivity application 309 is roaming, licensing client 311 transfers an authorization request to application server 323 that includes the user ID 314 associated with user 302 to OLS server 325. OLS server 325 processes the request and returns a keyless authorization to productivity application 309, thereby allowing user 302 to engage with and use productivity application 309.

Alternatively, the bootstrapper application may be aware of the environment within which productivity application 309 will be deployed, and thus can set the value accordingly to indicate roaming to productivity application 309. The bootstrapper application can become aware of the environment by communicating with other applications executing within the same environment, such as browser application 309, or possibly communicating with operating system elements, to determine the environment within which productivity application 309 will be executed.

The keyless authorization may be an electronic license that is recognized by productivity application 309, such as an activation configuration identifier (ACID) corresponding to a license file provided in the download of productivity application 309. A proper ACID may be recognized as valid for full access, which could be considered a valid authorization. In the event that user 302 is not authorized, OLS server 325 may return an indication indicating as much. Productivity application 309 may then disable certain features and run in a reduced functionality mode. However, it is also possible that productivity application 309 simply limits access entirely. In one example, ACID is returned by OLS server 325 may represent whether or not user 302 is authorized for full access to productivity application 309. While one ACID may be recognized as valid for full access, which could be considered a valid authorization, another ACID may indicate to productivity application 309 that user 302 should be provided with only limited functionality, which could be considered a denial of authorization. Alternatively, a denial of authorization may be indicated by a response from OLS server 325 that provides no ACID at all, or an ACID that is not recognized by licensing client 311. In response, licensing client 311 may prompt user 302 for different credentials or the option to enter a key. Should the user decline to provide proper credentials, productivity application 309 could be closed.

The keyless authorization provides user 302 with temporary access to productivity application 309. In some cases, user 302 may be granted only a one-time use of productivity application 309 under the keyless authorization. In an example, productivity application 309 may be authorized for the duration of the user's interaction with content 310 or the user's interaction with application 309. For instance, even upon closing content 310, application 309 may remain open and active, allowing user 302 to create new documents or open and use other documents. Upon closing application 309, authorization would cease for productivity application 309 with respect to user 302.

The authorization is referred to as keyless because a key is not used by the authorization process supported by OLS server 325 to determine whether or not to allow access to productivity application 309. In contrast, SPP server 327 requires a key as an input to a validation process. The validation process operates on the key to determine its validity, and thereby the validity of the request made to access a productivity application. Examples of keys include the familiar 5×5 product keys provided with many common software purchases.

FIG. 6 illustrates another functional view 600 of authorization system 300 operating within a download and installation context. Functional view 600 includes install process 312, productivity application 309, and licensing client 311. Functional view 600 demonstrates an installation environment within which productivity application 309 is purchased and installed on client device 300.

In functional view 600, productivity application 309 is downloaded from application server 323. This occurs as a result of a purchase made by user 302 when interacting with commerce server 321. Commerce server 321 provides a notification of the purchase to OLS server 325. Part of the notification may identify user 302, perhaps by user ID 314. OLS server 325 passes a token to application server 323 that is associated with user 302 by way of user ID 314. Tying the token to a specific user identity assists OLS server 325 with authorizing user 302 when necessary.

Commerce server 321 also provides notification of the purchase to application server 323, which ultimately starts a download process to download productivity application 309 to client device 300. As mentioned, OLS server 325 provides application server 323 with the token, thereby allowing application server 323 to provide the token along with the download of productivity application 309. Licensing client 311 communicates the token and user ID 314 to OLS server 325 to attempt an authorization of productivity application 309. Licensing client 311 also engages with SPP server 327 to authorize productivity application 309 using a key, which will be described in more detail with respect to FIG. 7.

Referring now to FIG. 7, illustrated is an operational sequence 700 involving the components provided in functional view 600. The sequence begins with a purchase of productivity application 309. In response to the purchase, OLS server 325 is notified of the purchase and responsively provides application server 323 with the token. Productivity application 309 is downloaded from application server 323 for installation on client device 300. Along with productivity application 309, the token is downloaded.

During the installation of productivity application 309, licensing client 311 must determine which authorization process to use to authorize productivity application 309. Briefly, licensing client 311 may use the key-based authorization process supported by SPP server 327 or the keyless authorization process supported by OLS server 325, depending upon conditions surrounding the installation and execution of productivity application 309. The progress made by install process 312 may be one factor that governs which installation process is used. For example, portions of productivity application 309 that support the key-based process might not yet be downloaded and installed at the time authorization is required. Rather than delay access to productivity application 309, licensing client 311 can instead attempt to obtain authorization by way of the keyless authorization process supported by OLS server 325.

The availability of the authorization process supported by SPP server 327 may be determined by licensing client 311 in a number of ways. As discussed with respect to FIGS. 4 and 5, a bootstrapper application may be deployed with the download of productivity application 309 that sets a value in memory indicative of the presence or absence of the key-based authorization process. Licensing client 311 can then read this value, which drives its selection of the preferred authorization process. Alternatively, install process 312 may itself track the installation progress and communicate the progress to licensing client 311. Licensing client 311 can then select either authorization process based on the installation progress reported to it by install process 312. It should be understood that many other suitable mechanisms may be deployed for informing licensing process 311 of the environment or conditions surrounding the execution of productivity application 309.

In operational sequence 700, it is assumed for exemplary purposes that licensing client 311 selects the keyless authorization process with which to attempt to authorize productivity application 309. As a result, an authorization request is made to OLS server 325 to authorize the use of productivity application 309. The token is included in this request and is processed by OLS server 325 to validate client device 300 as an authorized destination for productivity application 309. User ID 314 may also be provided along with the token to supplement the authorization process performed by OLS server 325. OLS server 325 provides a keyless authorization in response that provides a temporary authorization to productivity application 309. At that point, productivity application 309 is unlocked and available to user 302, even though the install process might not yet be complete. This allows user 302 to use productivity application 309 quickly after purchase, rather than be delayed until a full installation is completed.

As mentioned with respect to FIG. 5, the keyless authorization may be an electronic license that is recognized by productivity application 309, such as an activation configuration identifier (ACID). A proper ACID may be recognized as valid for full access, which could be considered a valid authorization. In the event that user 302 is not authorized, OLS server 325 may return an indication indicating as much. Productivity application 309 may then disable certain features and run in a reduced functionality mode. However, it is also possible that productivity application 309 simply limits access entirely. Licensing client 311 may prompt the user for different credentials and may close productivity application 309 should the user decline to provide proper credentials.

OLS server 325 may also provide productivity application 309 with a key that can be used later, once the installation of productivity application 309 has completed, to obtain a more permanent, key-based authorization. Some portions that may take longer to install than others include an SPP client that interfaces with SPP server 327 to provide key-based authorization functions. Productivity application 309 eventually requests authorization from SPP server 327 using the key, in response to which SPP server 327 may provide the authorization.

Figure 8:
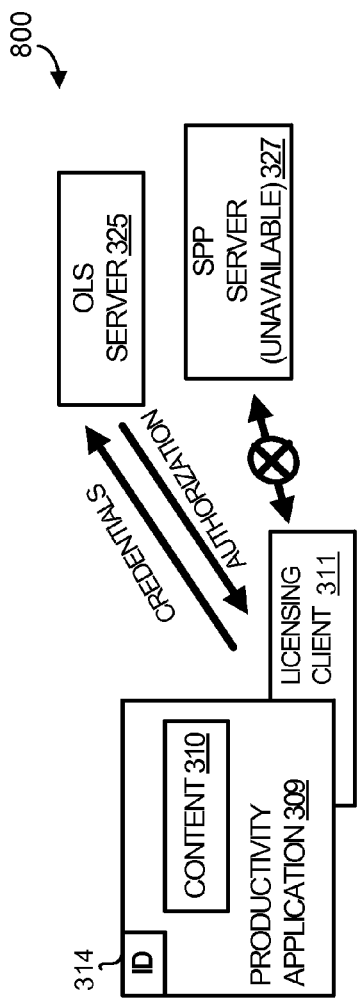
FIG. 8 illustrates a functional view of an authorization system.

FIG. 8 illustrates yet another functional view 800 of authorization system 300 which considers an implementation involving an unavailable authorization process. Functional view 800 includes productivity application 309 and licensing client 311. Licensing client 311 must determine which authorization process to use to authorize productivity application 309. In this example, factors governing this decision include the availability of SPP server 327. As shown, SPP server 327 is unavailable, thus driving licensing client 311 to communicate with OLS server 325 to attempt authorization. Accordingly, licensing client 311 communicates with OLS server 325 by way of an exchange of credentials and authorization.

SPP server 327 may be unavailable for a number of reasons. For example, SPP server 327 may be taken out of service temporarily for maintenance or upgrades. It is also possible that a communication link allowing licensing client 311 to communicate with SPP server 327 may be out of service. Regardless, SPP server 327 can come back online, eventually allowing for a key-based authorization, as will be discussed with respect to FIG. 9 below.

Figure 9:
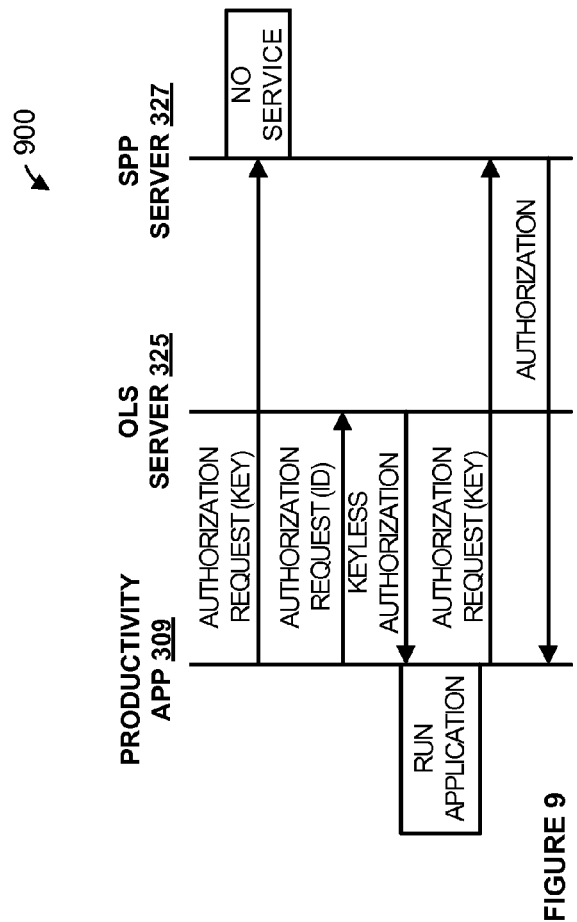
FIG. 9 illustrates an operational sequence for an authorization system.
Figure 10:
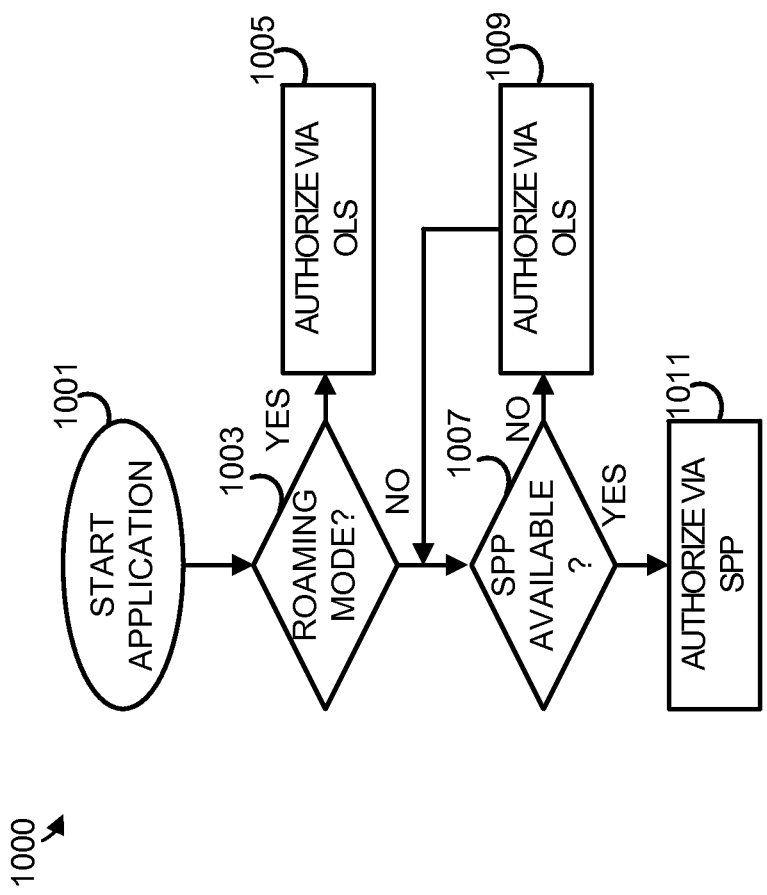
FIG. 10 is a flow diagram describing authorization system operations.

Referring to FIG. 9, illustrated is an operational sequence 900 involving the components provided in functional view 800. In this sequence, productivity application 309 attempts to gain authorization using a key from SPP server 327 by way of licensing client 311. However, as indicated SPP server 327 is initially unavailable. As a result, licensing client 311 requests authorization from OLS server 325 using user ID 314 associated with user 302. Licensing client 311 may also exchange a token with OLS server 325, as discussed with respect to FIG. 7.

OLS server 325 provides an authorization in response that gives user 302 temporary access to productivity application 309. As mentioned with respect to FIG. 5, the keyless authorization may be an electronic license that is recognized by productivity application 309, such as an activation configuration identifier (ACID). Denial of authorization may be indicated by a response from OLS server 325 that provides no ACID at all, or an ACID that is not recognized by licensing client 311, or provides an indication of unauthorized use in some other manner. In response, licensing client 311 may prompt the user for different credentials and may close productivity application 309 should the user decline to provide proper credentials.

The keyless authorization provided by OLS server 325 allows productivity application 309 to run, and thus gives user 302 the ability to be productive even though SPP server 327 is unavailable. In the meantime, productivity application 309 can continue to request permanent, key-based authorization from SPP server 327. Once SPP server 327 becomes available, it may provide authorization based on whether or not the key provided by productivity application 309 is a valid key. The authorization provided by SPP server 327 can be a perpetual authorization, although it should be understood that periodic authorization checks or reallocation of keys could occur within the context of this discussion.

FIG. 10 illustrates a process 1000 that may be implemented by licensing client 311 executing on client device 300. Process 1000 is exemplary of how licensing client 311 may select or identify a preferred authorization process, from several authorization processes, with which to attempt to authorize productivity application 309.

Referring to process 1000, productivity application 309 is started, which may occur when the application is installed, launched from within a browser, initiated locally, or by any other similar way of initiating an application (step 1001). It should be understood that initiating productivity application 309 may take the form of actually running an executable file that comprises the application. However, running other executable files, such as a bootstrapper, may also be representative of initiating the application. User 302 clicking on a link or hosted document that, in turn, launches an application may also be representative of initiating productivity application 309.

Next, licensing client 311 determines whether or not it is in roaming mode (step 1003). Licensing client 311 may accomplish this by checking a value set in memory indicative of the roaming state of productivity application 309. Alternatively, licensing client 311 may communicate with other applications or operating system components to determine the roaming state of productivity application 309. In any case, productivity application 309 can generally be considered to be roaming when launched from a hosted service and streamed to client device 300. This may occur when productivity application 309 is not installed locally, and thus must be provided from elsewhere. In an alternative to determining whether or not it is in roaming mode, licensing client 311 may check whether or not OLS server 325, or the keyless authorization process in general, is available.

If application 309 is in roaming mode, then authorization is performed via OLS server 325 (step 1005). As discussed at length above, OLS server 325 authorizes productivity application 309 using a variety of inputs, such a user ID 314, a token, or other suitable ways of identifying user 302 to OLS server 325. If user 302 is authorized to use productivity application 309, then OLS server 325 communicates this to licensing client 311 and productivity application 309 is provided to user 302 with full functionality. If user 302 is not authorized, then OLS server 325 may communicate the denial to licensing client 311, which then takes action to either authorize user 302 in some other manner or limit user 302 from accessing productivity application 309 entirely or in part.

If application 309 is not in roaming mode, or if OLS server 325 is otherwise unavailable, then licensing client 311 checks whether or not SPP server 327 is available (step 1007). Licensing client 311 can determine the availability of SPP server 327 in a variety of ways, including attempting to communicate with SPP server 327. Alternatively, licensing client 311 may attempt to communicate with an SPP module that may be installed on client device 300. The presence of the SPP module would indicate to licensing client 311 that the authorization service provided by SPP server 327 may be available. The absence of the SPP module might indicate to licensing client 311 that portions of productivity application 309 pertaining to the key-based authorization service have yet to be installed, thus rendering the key-based authorization service unavailable.

If SPP server 327 is not available, then licensing client 311 attempts to obtain authorization using the keyless authorization process supported by OLS server 325 (step 1009). OLS server 325 authorizes productivity application 309 using a variety of inputs, such a user ID 314, a token, or other suitable ways of identifying user 302 to OLS server 325. If user 302 is authorized to use productivity application 309, then OLS server 325 communicates this to licensing client 311 and productivity application 309 is provided to user 302 with full functionality. Otherwise, OLS server 325 may communicate a denial to licensing client 311, resulting in limited or blocked access to productivity application 309.

However, if SPP server 327 is available, then licensing client 311 communicates with SPP server 327 to attempt to gain authorization (step 1011). This may involve transferring a key to SPP server 327 for processing. Other identifying information may be provided along with the key, such as user ID 314 or a product identifier associated with productivity application 309, to assist SPP server 327 with determining the authorization status for productivity application 309.

It should be understood that licensing client 311 may continuously monitor the availability of SPP server 327 and change preferred authorization processes should conditions change. For instance, licensing client 311 may initially select a keyless authorization process as the preferred authorization process upon the initiation of productivity application 309. However, while attempting to authorize using the keyless authorization process, SPP server 327 may become available. This could trigger licensing client 311 to cease the keyless authorization process and instead attempt to authorize user 302 using the key-based authorization process supported by SPP server 327.

Referring back to FIG. 3, client device 300 includes processing system 301, storage system 303, software 305, user interface 306, and communication interface 307. User interface 306 may include a mouse, a voice input device, a touch input device, and other comparable input devices and associated processing elements capable of receiving user input from user 302. Output devices such as a display, speakers, printer, and other types of output devices may also be included.

Processing system 301 is communicatively coupled with storage system 303. Storage system 303 stores software 305, and in particular, stores productivity application 309 and licensing client 311. Software 305 may include other applications, such as browser application 308 and install process 312 illustrated in FIG. 4 and FIG. 6 respectively. When executed by processing system 301, productivity application 309 and licensing client 311 direct client device 300 to operate as described herein for authorization system 300 with respect to FIGS. 4-10.

Processing system 301 may comprise microprocessors and other circuitry that retrieve and execute productivity application 309 and licensing client 311 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device.

Storage system 303 may comprise any storage media readable by processing system 301 and capable of storing productivity application 309 and licensing client 311. Storage system 303 may include volatile and nonvolatile, removable and non-removable media implemented in any method or technology for storage of information, such as computer readable instructions, data structures, program modules, or other data. Storage system 303 may be implemented as a single storage device but may also be implemented across multiple storage devices or sub-systems. Storage system 303 may comprise additional elements, such as controllers, capable of communicating with processing system 301.

Examples of storage media include random access memory, read only memory, magnetic disks, optical disks, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Productivity application 309 and licensing client 311 comprise computer program instructions, firmware, or some other form of machine-readable processing instructions. Productivity application 309 and licensing client 311 may each be implemented as a single application but also as multiple applications, or integrated together. In general, productivity application 309 and licensing client 311, when loaded into processing systems 301, transform client device 300 from a general-purpose computing system into a special-purpose computing system customized to operate as described for authorization system 300.

Communication interface 307 may include communication connections and devices that allow for communication between client device 300 and commerce server 321, application server 323, OLS server 325, and SPP server 327. Examples of connections and devices that together allow for inter-system communication include network interface cards, antennas, power amplifiers, RF circuitry, transceivers, and other communication circuitry.

Client device 300 communicates with commerce server 321, application server 323, OLS server 325, and SPP server 327 over communication network 320. Communication network 320 may be any network or collection of networks capable of carrying communications between client device 300 and commerce server 321, application server 323, OLS server 325, and SPP server 327. The aforementioned networks, connections, and devices are well known in the art and need not be discussed at length here.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for licensing applications, the method comprising:

identifying conditions associated with an initiation of an application; selecting, based on the conditions, a preferred authorization process from at least a key-based authorization process and a keyless authorization process with which to authorize the application; and attempting to authorize the application using the preferred authorization process;

wherein the conditions comprise a roaming status of the application and an installation status of the key-based authorization process, wherein the keyless authorization process is selected as the preferred authorization process when the roaming status is roaming, and wherein the keyless authorization process is selected as the preferred authorization process when the installation status is incomplete.

2. The method of claim 1 wherein the roaming status is roaming when the application is provided in a streaming form.

3. The method of claim 1 further comprising performing the keyless authorization process during installation of the key-based authorization process.

4. The method of claim 3 further comprising, to implement the keyless authorization process, transferring an authorization request with credentials for delivery to an authorization server and, in response, receiving an authorization response that provides temporary access to the application.

5. The method of claim 4 wherein the credentials comprise at least one of an identity of a user and a token provided during installation of the application.

6. The method of claim 1 further comprising, upon selecting the preferred authorization process, monitoring for a change in the conditions associated with the application, and responsive to detecting the change in the conditions, attempting to authorize the application using another authorization process different from the preferred authorization process.

7. One or more non-transitory computer readable media having stored thereon program instructions for licensing applications that, when executed by a processing system, direct the processing system to:

identify conditions associated with an initiation of an application;

select, based on the conditions, a preferred authorization process from a plurality of authorization processes of at least a key-based authorization process and a keyless authorization process with which to authorize the application; and initiate an attempt to authorize the application using the preferred authorization process;

wherein the conditions comprise a roaming status of the application and an installation status of the key-based authorization process, wherein the keyless authorization process is selected as the preferred authorization process when the roaming status is roaming, and wherein the keyless authorization process is selected as the preferred authorization process when the installation status is incomplete.

8. The one or more non-transitory computer readable media of claim 7 wherein the conditions associated with the application comprise an environment within which the application is executed and a status of each of the plurality of authorization processes.

9. The one or more non-transitory computer readable media of claim 8 wherein a first authorization process of the plurality of authorization processes is selected as the preferred authorization process when the environment within which the application is executed is a roaming environment.

10. The one or more non-transitory computer readable media of claim 8 wherein a first authorization process of the plurality of authorization processes is selected as the preferred authorization process when the environment within which the application is executed is a roaming environment and when the status of a second authorization process of the plurality of authorization processes indicates that the second authorization process is unavailable.

11. The one or more non-transitory computer readable media of claim 7 wherein the program instructions, when executed by the processing system to implement the preferred authorization process, further direct the processing system to initiate a transfer of an authorization request with credentials for delivery to an authorization server requesting the authorization server to provide temporary access to the application.

12. The one or more non-transitory computer readable media of claim 7 wherein the program instructions, when executed by the processing system upon selection of the preferred authorization process, further direct the processing system to monitor for a change in the conditions associated with the application and, responsive to detecting the change in the conditions, initiate an attempt to authorize the application using another authorization process different from the preferred authorization process.

13. The one or more non-transitory computer readable media of claim 7 wherein the plurality of authorization processes comprises a keyless authorization process and a key-based authorization process.

14. One or more non-transitory computer readable media having stored thereon program instructions for licensing applications that, when executed by a processing system, direct the processing system to:
- identify an environment within which an application is initiated;
- when the environment is a roaming environment, initiate a roaming attempt to authorize the application based on an identity of a user associated with the application;
- when the environment is not the roaming environment, initiate a key-based attempt to authorize the application based on a key associated with the application when a key-based process that performs the key attempt is available; and
- when the key-based process is not available, initiate a keyless attempt to authorize the application based on the identity of the user associated with the application;
- wherein the environment is the roaming environment when the application is streamed from an application server and the environment is not the roaming environment when the application is not streamed from an application server during installation of the application;
- wherein the application includes a key-based authorization process that performs the key-based attempt to authorize the application, and wherein the keyless attempt to authorize the application occurs prior to installation of the key-based authorization process.

15. The one or more computer readable media of claim 14 wherein the application includes a keyless authorization process that performs the keyless attempt to authorize the application and performs the roaming attempt to authorize the application.

16. The one or more computer readable media of claim 15 wherein the keyless authorization process uses the identity of the user and a token provided during the installation of the application to authorize the application and does not use the key.

* * * * *